United States Patent [19]
Talluri et al.

[11] Patent Number: 6,049,808
[45] Date of Patent: Apr. 11, 2000

[54] SYSTEM AND METHOD FOR EFFICIENT REMOTE DISK I/O

[75] Inventors: Madhusudhan Talluri, Fremont; Marshall C. Pease, Mountain View; Srinivasan Viswanathan, Fremont, all of Calif.

[73] Assignee: Sun Microsystems, Inc., Palo Alto, Calif.

[21] Appl. No.: 09/216,507

[22] Filed: Dec. 18, 1998

Related U.S. Application Data

[63] Continuation of application No. 08/885,058, Jun. 30, 1997, Pat. No. 5,884,313.

[51] Int. Cl.⁷ .................................................. G06F 17/30
[52] U.S. Cl. ........................... 707/201; 707/10; 707/103; 707/104; 707/200; 707/202; 707/203; 707/204; 709/200
[58] Field of Search .............................. 707/10, 103, 104, 707/200, 201, 202, 203, 204; 710/3, 9, 105, 107, 129, 200; 711/220; 709/200; 713/1

[56] References Cited

U.S. PATENT DOCUMENTS

| | | | |
|---|---|---|---|
| 4,825,358 | 4/1989 | Letwin ........................................ | 713/1 |
| 5,729,682 | 3/1998 | Marquis .................................... | 710/22 |
| 5,787,483 | 7/1998 | Jam ........................................ | 711/158 |
| 5,887,134 | 3/1999 | Ebrahim .................................... | 710/22 |

*Primary Examiner*—Thomas G. Black
*Assistant Examiner*—Diane D. Mizrahi
*Attorney, Agent, or Firm*—Pennie & Edmonds LLP

[57] ABSTRACT

When a client computer requests data from a disk or similar device at a server computer, the client exports the memory associated with an allocated read buffer by generating and storing one or more incoming MMU (IMMU) entries that map the read buffer to an assigned global address range. The remote data read request, along with the assigned global address range is communicated to the server node. At the server, the request is serviced by performing a memory import operation, in which one or more outgoing MMU (OMMU) entries are generated and stored for mapping the global address range specified in the read request to a corresponding range of local physical addresses. The mapped local physical addresses in the server are not locations in the server's memory. The server then performs a DMA operation for directly transferring the data specified in the request message from the disk to the mapped local physical addresses. The DMA operation transmits the specified data to the server's network interface, at which the mapped local physical addresses to which the data is transferred are converted into the corresponding global addresses. The specified data with the corresponding global addresses are then transmitted to the client node. The client converts the global addresses in the received specified data into the local physical addresses corresponding to the allocated receive buffer, and stores the received specified data in the allocated receive buffer.

6 Claims, 6 Drawing Sheets

Prior Art

FIG. 1

Prior Art

FIG. 2

Prior Art

FIG. 3

Prior Art

SYSTEM AND METHOD FOR EFFICIENT REMOTE DISK I/O

This application is a continuation of U.S. patent application Ser. No. 08/885,058, filed Jun. 30, 1997, entitled "System and Method for Efficient Disk I/O," now U.S. Pat. No. 5,884,313, issued Mar. 16, 1999.

The present invention relates generally to computer networks using memory mapped data transfers for enabling a first computer to access data or programs stored on a disk, or other non-random access computer memory device, that is physically coupled to a second computer, and more particularly to a system and method for making such remote disk access more efficient by directly routing data from the disk in the remote server to a communications bus without first making a copy of the data in the remote server's memory.

BACKGROUND OF THE INVENTION

In many multiple-node computer systems it is important for processes or tasks running on one computer node (sometimes called the client) to be able to access information stored on a disk or similar device that is associated with another computer node (sometimes called the server). Generally, accessing data on a remotely located disk is expensive in terms of latency and resources used. The present invention provides a system and method for reducing both the latency and the resources used on the server node when a client node performs a disk read from a disk located at (or attached to) the server node.

Figure 1:
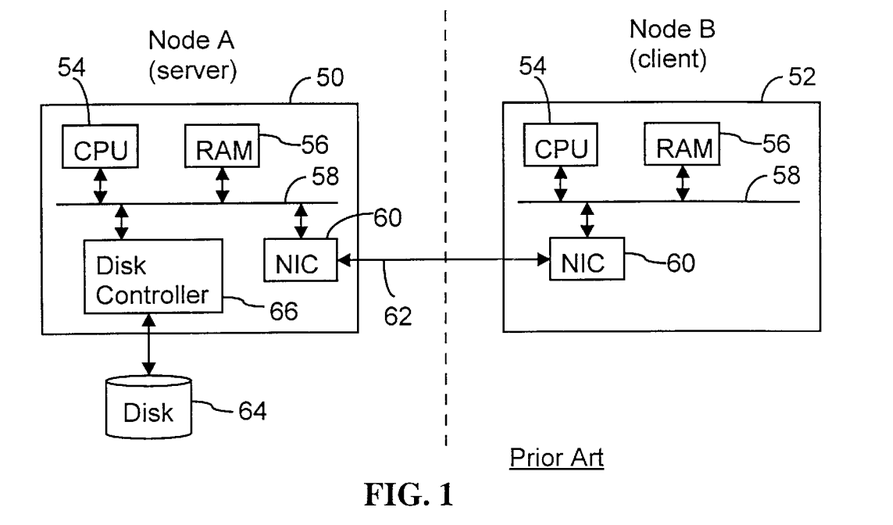
FIG. 1 is a block diagram of two computer nodes in a computer network.

Referring to FIG. 1, there is shown a highly simplified representation of two computer nodes herein called Node A or the server 50, and Node B or the client 52. The computer at each node can be any type of computer. In other words, the particular brand, architecture and operating system is of no importance to the present discussion, so long as each computer node is configured to operate in a networked environment. Each computer node 50, 52 will typically include a central processing unit (CPU) 54, random access memory 56, an internal memory bus 58 and a communications interface 60, often called a network interface card (NIC). The computer nodes communicate with each other by transmitting messages or packets to each other via a network interconnect 62, which may include one or more types of communication media, switching mechanisms and the like.

For the purposes of this discussion it is assumed that the NIC is suitable for memory mapped message passing. That is, the NIC must be directly addressable using local physical addresses, and direct loads and stores to from and to locations in a remote computer node can be performed through the NIC without having to use the NIC's driver software.

Further, since the present invention involves remote disk access, at least one of the computer nodes 50 has a non-volatile, non-random access memory device 64, such as a high speed magnetic disk, and a corresponding disk controller 66. Actually, in many implementations most or all of the computer nodes will have one or more local disk drives. However, since we are only interested in explaining how one computer node 52 accesses data on the disk 64 connected to another computer node 50, just the disk 64 for the server node 50 is shown in FIG. 1.

It should be noted that the term "message transmission" is sometimes used to indicate or imply the use of a message transmission protocol in which the receiving system automatically processes the transmitted message, while the term "data transmission" simply indicates the writing or copying of data from one system to another. However, in this document, the terms "message transmission" and "data transmission" will be used interchangeably.

Figure 2:
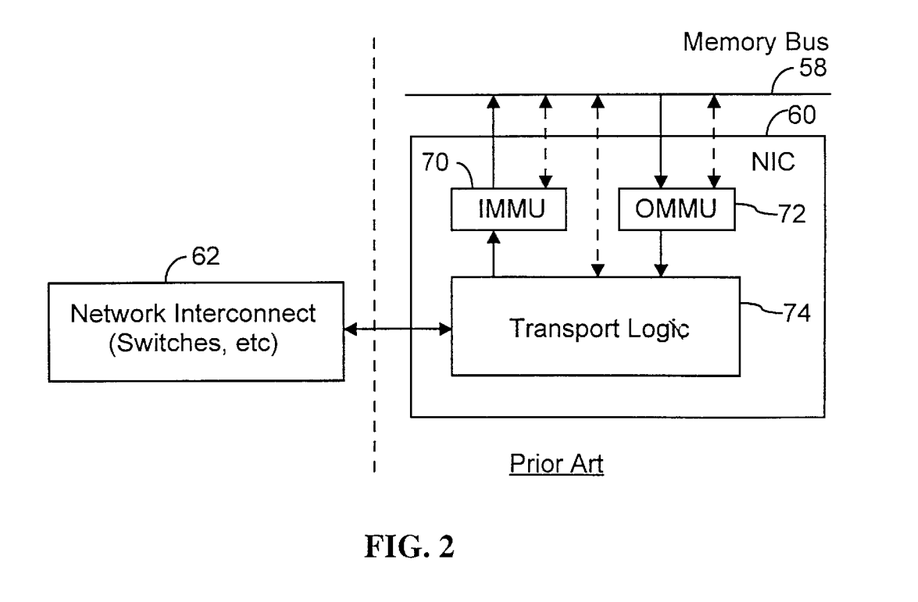
FIG. 2 is a block diagram depicting the components of the communications interface found in each computer of a computer network.

FIG. 2 shows a simplified representation of a conventional communications interface (or NIC) 60, such the ones used in the computer nodes of FIG. 1, showing only the components of particular interest. The NIC 60 typically includes two address mapping mechanisms: an incoming memory management unit (IMMU) 70 and an outgoing memory management unit (OMMU) 72. The purpose of the two memory management units are to map local physical addresses (PA's) in each computer node to global addresses (GA's) and back. Transport logic 74 in the NIC 60 handles the mechanics of transmitting and receiving message packets, including looking up and converting addresses using the IMMU 70 and OMMU 72.

The dashed lines between the memory bus 60 and the IMMU 70 and OMMU 72 represent CPU derived control signals for storing and deleting address translation entries in the two MMU's, typically under the control of a NIC driver program. The dashed line between the memory bus 60 and the transport logic 74 represents CPU derived control signals for configuring and controlling the transport logic 74.

Memory Mapping between Virtual, Local Physical and Global Address Spaces

Figure 3:
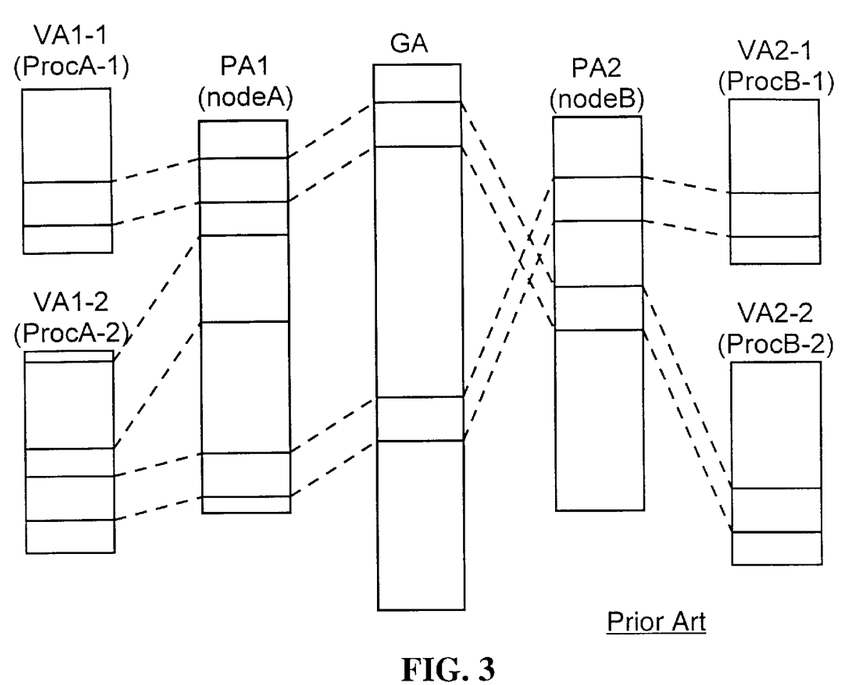
FIG. 3 depicts virtual, local and global address spaces and mappings between those address spaces.
Figure 4:
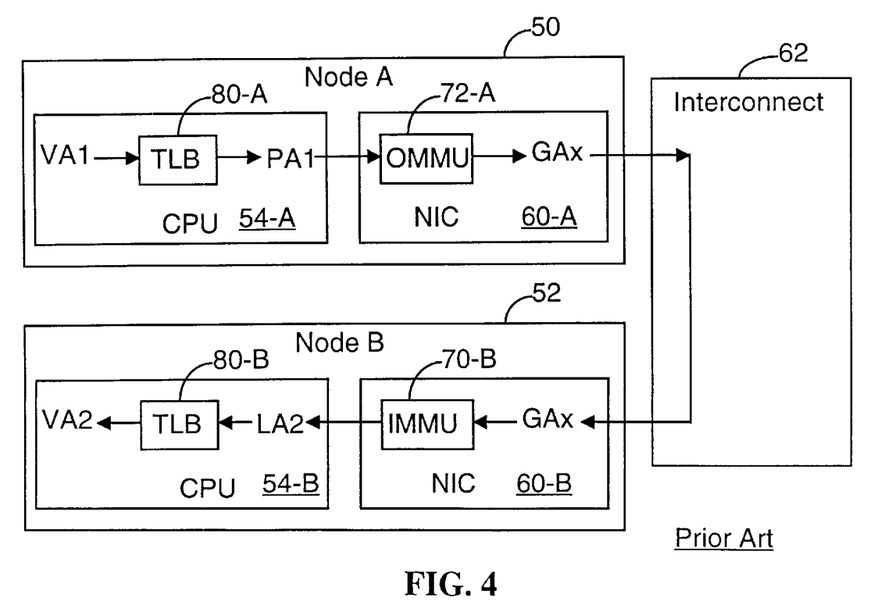
FIG. 4 is a block diagram of the computer modules used to perform address translations associated with transmitting data from a first node to a second node of a distributed computer system.

Referring to FIGS. 3 and 4, the nodes in a distributed computer system (such as those shown in FIG. 1) utilize a shared global address space GA. Each node maps portions of its local address space LA into "windows" in the global address space. Furthermore, processes on each of the nodes map portions of their private virtual address space VA into the local physical address space PA, and can furthermore export a portion of the local physical address space PA into a window in the global address space GA. The process of "exporting" a portion of the local physical address space is also sometimes referred to as "exporting a portion of the local physical address to another node," because a specific other computer node is given read and/or write access to the exported portion of the local physical address space via an assigned global address space range.

It should be noted that the local physical addresses (e.g., PA1 and PA2) shown in FIGS. 3 and 4 are physical bus addresses and are not necessarily memory location addresses. In fact, many physical addresses are actually mapped to devices other than memory, such as the network interface. For example, when physical memory on a first computer is exported to a second computer, the physical addresses used in the second computer to write to the exported memory are not mapped to any local memory; rather they are mapped to the second computer's network interface.

When a message containing a destination address is sent from a process in node A 50 to a process in node B 52, a series of address translations (also called address mapping translations) are performed on the destination address. A virtual address VAI from a process in node A is first translated by the TLB (translation lookaside buffer) 80-A in node A's CPU 54-A into a local physical address PA1. The local physical address PA1 is then translated by the outgoing MMU (OMMU) 72-A in node A's network interface 60-A into a global address GAx. When the message containing the global address is received by node B, the global address GAx is converted by the incoming MMU (IMMU) 70-B in node B's network interface 60-B into a local physical address PA2 associated with node B. The local physical address PA2 corresponds to a virtual address VA2 associated with a receiving process. A TLB 80-B in node B's CPU 54-B maps the virtual address VA2 to the local address PA2 where the received message is stored.

It should be noted here that TLBs generally only translate virtual addresses into local physical addresses, and not the other way around, and thus some of the arrows in FIG. 4 represent mappings rather than actual address translations. When the receiving process in the node B reads a received message at address VA2, the TLB 80-B will translate that virtual address into the same local address LA2 determined by the network interface's IMMU 70-B as the destination address for the received message.

Address space ranges for receiving messages are pre-negotiated between the sending and receiving nodes using higher level protocols that typically use reserved address space, mailbox, or packet based communications that are set up for this purpose. The details of how windows in the global address space are assigned and how receiver side addresses are set up for receiving messages are beyond the scope of this document. Furthermore, the present invention does not require any changes in such communication setup mechanisms.

Receive buffers are typically allocated in page size chunks, since each MMU entry generally represents a mapping of one or more pages (and more generally $2^n$ pages, for integer values of $n \geq 0$) of address space. Larger receive buffers, or receive buffers of irregular size, may be constructed using multiple MMU entries by user level protocols. Once the receive buffers are allocated and the corresponding MMU mappings are established, user level programs can manage the receive buffers without kernel intervention. Many different kinds of user level message passing "API's" (application program interfaces) can be built on top of the basic receive buffer mechanism. This includes the send and receive Unix primitives, sockets, ORB (object resource broker) transport, remote procedure calls, and so on. The basic message passing mechanism is designed to be as "light weight" and efficient as possible, so as to take as few processor cycles as possible.

The present invention utilizes the local physical address to global address mapping mechanisms discussed above.

Conventional Remote Disk Read Methodology

Figure 5:
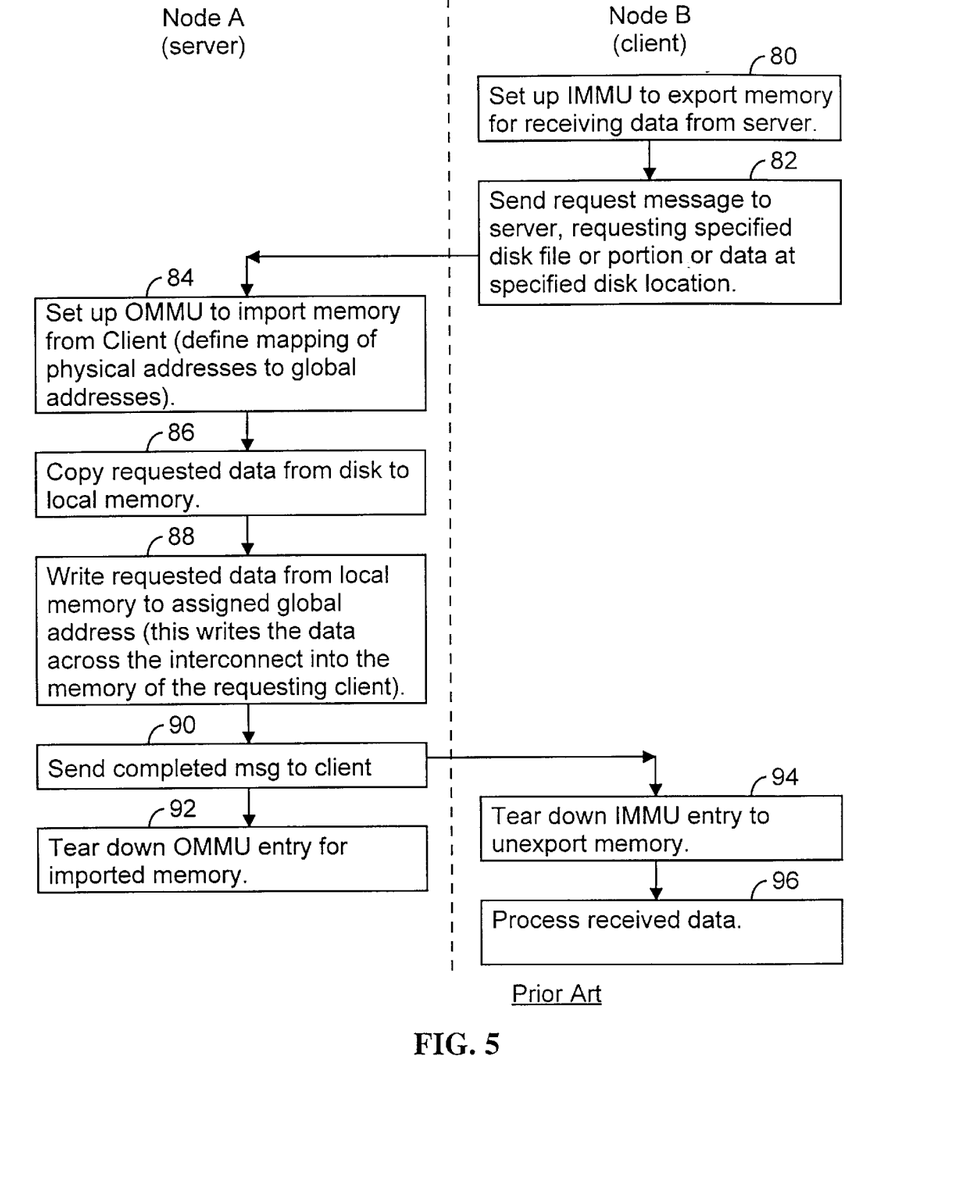
FIG. 5 is a flow chart of a conventional procedure for a process on a first computer node B to read information from a disk at another computer node A.

FIG. 5 shows the conventional procedure for a process on node B to read information from a disk at node A. The first step is for Node B to set up a receive buffer by "exporting memory" to Node A (step 80), so that Node A can write a message into it. In some implementations, this step may be performed in advance, because it is known in advance that Node B will be performing many disk reads from Node A. In most implementations, however, the memory exporting step is performed in response to a remote disk read request by a user or kernel process in Node B. The memory exporting step 80 is performed by creating an IMMU entry in Node B that maps the physical address range of a receive buffer in Node B's memory to a corresponding range of global addresses. As indicated above, Node B will typically have a range of global addresses preassigned to it for exporting memory to other nodes. However, other mechanisms for assigning global addresses would be equally applicable.

Next, at step 82, a request message is transmitted by the client node (Node B) to the server node (Node A) at which the requested information is stored. The request message specifies:

the destination node to which the message is being transmitted;

the source node from which the message is being sent;

the information source, such as a disk file, disk file portion or disk location range that contains the requested information;

the global address to which the requested information is to be transmitted; and other parameters, such as protocol parameters, not relevant here.

At the server (Node A), when the request message is received, the server sets up an OMMU entry to import the memory being exported by the requesting client node, Node B, (step 84). The OMMU entry set up at step 84 maps a range the global address range specified in the received message to a corresponding range of physical memory in the server node. If necessary (e.g., if insufficient contiguous memory is available and/or the size of the mapped address range is not equal to $2^n$ pages), the server node will generate two or more OMMU entries so as to map the specified global address space to two or more local physical address ranges.

Once the IMMU in the requesting node B and the OMMU in the responding or sending node A have been set up, the transmission of the requested data begins. In particular, the requested disk data is first copied by node B to the local physical memory range(s) previously mapped into the OMMU entries (step 86), typically using a disk controller DMA operation to perform the data transfer. Then the contents of the local physical memory range(s) are written from local memory to the assigned global addresses (step 88). Writing data to a global address causes the sending node's communication interface to transmit the data being written to the node associated with those global addresses, as indicated in the sending node's OMMU entry (or entries) for those global addresses. This data transmission operation (step 88) may be performed under direct CPU control by "programmed I/O" instructions, or it may be performed by a communications interface (NIC) DMA operation (i.e., in which case the DMA logic in the communication interface handles the transfer of data from local physical memory to the communications network). Finally, after the requested data has been completely transmitted to the receive buffer in the requesting node, a "completed" message is typically transmitted by the sending node to a predefined message queue location in the requesting node (step 90), so as to inform the requesting node that the transmission of the requested data has been completed.

After the server transmits the requested data to the requesting node (steps 86, 88 and 90), the server "tears down" the connection by deleting the OMMU entry (or entries) for the imported memory associated with the request from Node B.

In response to the completed message, the requesting node tears down its side of the connection by deleting the corresponding IMMU entry (or entries) so as to unexport the memory used for the request, and to return local read/write control to that portion of the requesting system's local physical memory (step 94). Then, or in parallel with the tear down operation, the requesting node processes the received data (step 96).

Of course, the prior art includes many variations on the sequence of operations described above with reference to FIG. 5 for performing a remote disk read operation. However, the steps described are typical for distributed computer system using UNIX™ (a trademark of SCO) type operating systems, such as Solaris™ (a trademark of Sun Microsystems, Inc.).

SUMMARY OF THE INVENTION

The present invention is a system and method for making remote disk reads, and similar remote data retrieval operations from memory storage devices on remote nodes, more efficient. In a distributed computer system using the present invention, there are multiple computers or computer nodes, including one that is called a client node for the purposes of performing a remote read operation and another that is called a server node. Both the client and server nodes may, in fact, be part of a cluster of computer nodes that operate as a single server node from the viewpoint of computers outside the server cluster.

When the client node requests data from a disk or similar device at the server node, the client node exports the memory associated with an allocated read buffer by generating and storing one or more incoming MMU (IMMU) entries that map the read buffer to an assigned global address range. The remote data read request, along with the assigned global address range is communicated to the server node.

At the server node, the request is serviced by performing a memory import operation, in which one or more outgoing MMU (OMMU) entries are generated and stored for mapping the global address range specified in the read request to a corresponding range of local physical addresses. The mapped local physical addresses in the server are not locations in the server's memory. The server then performs a disk controller DMA operation for directly transferring the data specified in the request message from the disk to the mapped local physical addresses. The DMA operation transmits the specified data to the server's network interface, at which the mapped local physical addresses to which the data is transferred are converted into the corresponding global addresses. The specified data with the corresponding global addresses are then transmitted to the client node.

The client node responds to receipt of the specified data by converting the global addresses in the received specified data into the local physical addresses corresponding to the allocated receive buffer, and storing the received specified data in the allocated receive buffer.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 6:
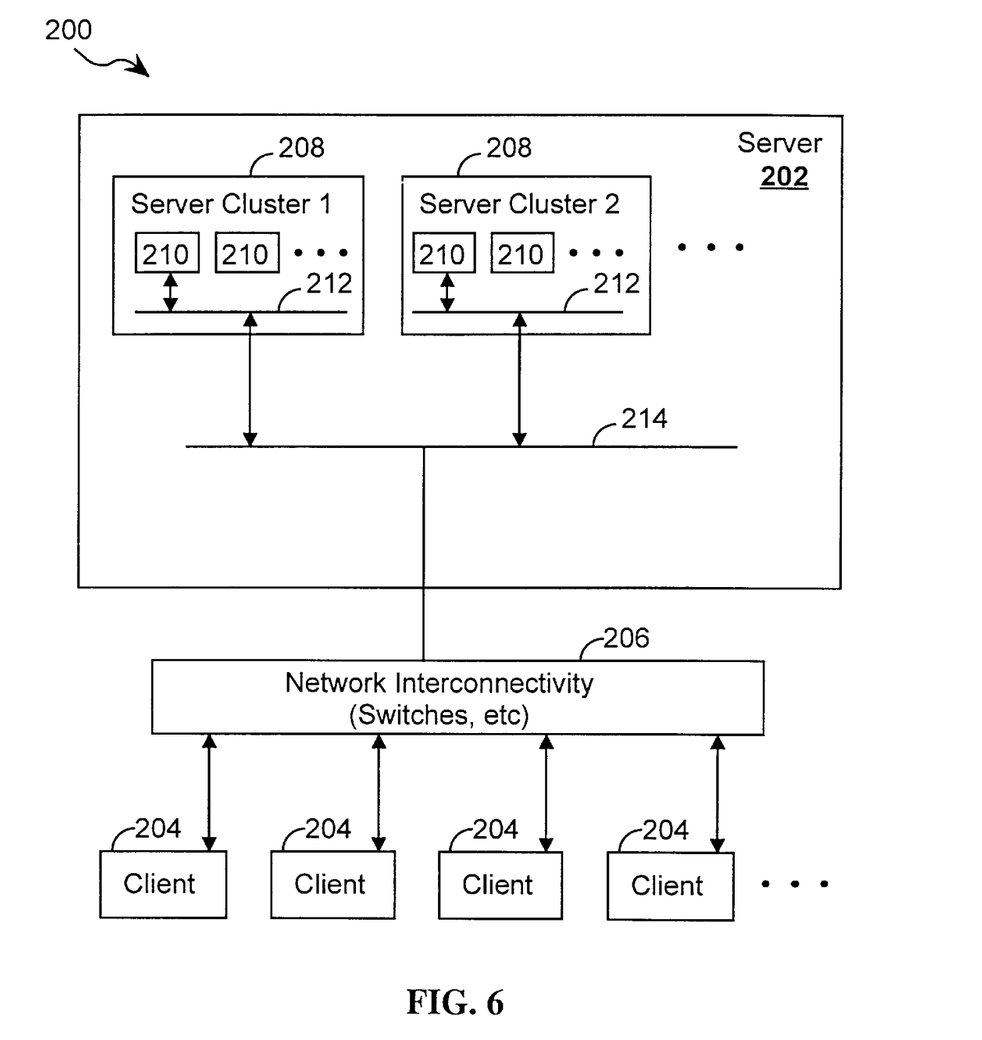
FIG. 6 depicts a computer system having a cluster of computers operating as a single server node.

Referring to FIG. 6, there is shown a distributed computer system 200 that includes a multi-CPU server 202 and numerous client computers 204 that are coupled to the server via one or more communication networks 206. The server 202 includes one or more a clusters 208 of computers 210 so as to provide more computational services to the clients 204 than could be provided by a single server computer. The server 202 is sometimes referred to as "the server cluster". For the purposes of the present document, it is irrelevant whether two server computers 210 that need to share information are in the same or different clusters 210.

Computational and file serving tasks are distributed over the server's computers 210. As a result, the data needed by a process running on one server computer may be located in a disk or similar memory device that is part of (or connected to) another server computer.

The present invention is primarily directed at a method of making "remote disk read" operations more efficient. That is, when a first computer 210 in the server 202 needs to read data stored in a disk at another computer 210 in the server, the present invention provides an efficient mechanism and methodology for performing that operation that is more efficient than the one described above with respect to FIG. 5.

For the purposes of describing the present invention, the terms "client" and "server" will both be used to refer to computers 210 within the server 202. However, the present invention could also be used to perform remote disk data read operations between any "true" client computer 204 and a server compute 210 in the server cluster 202.

Figure 7:
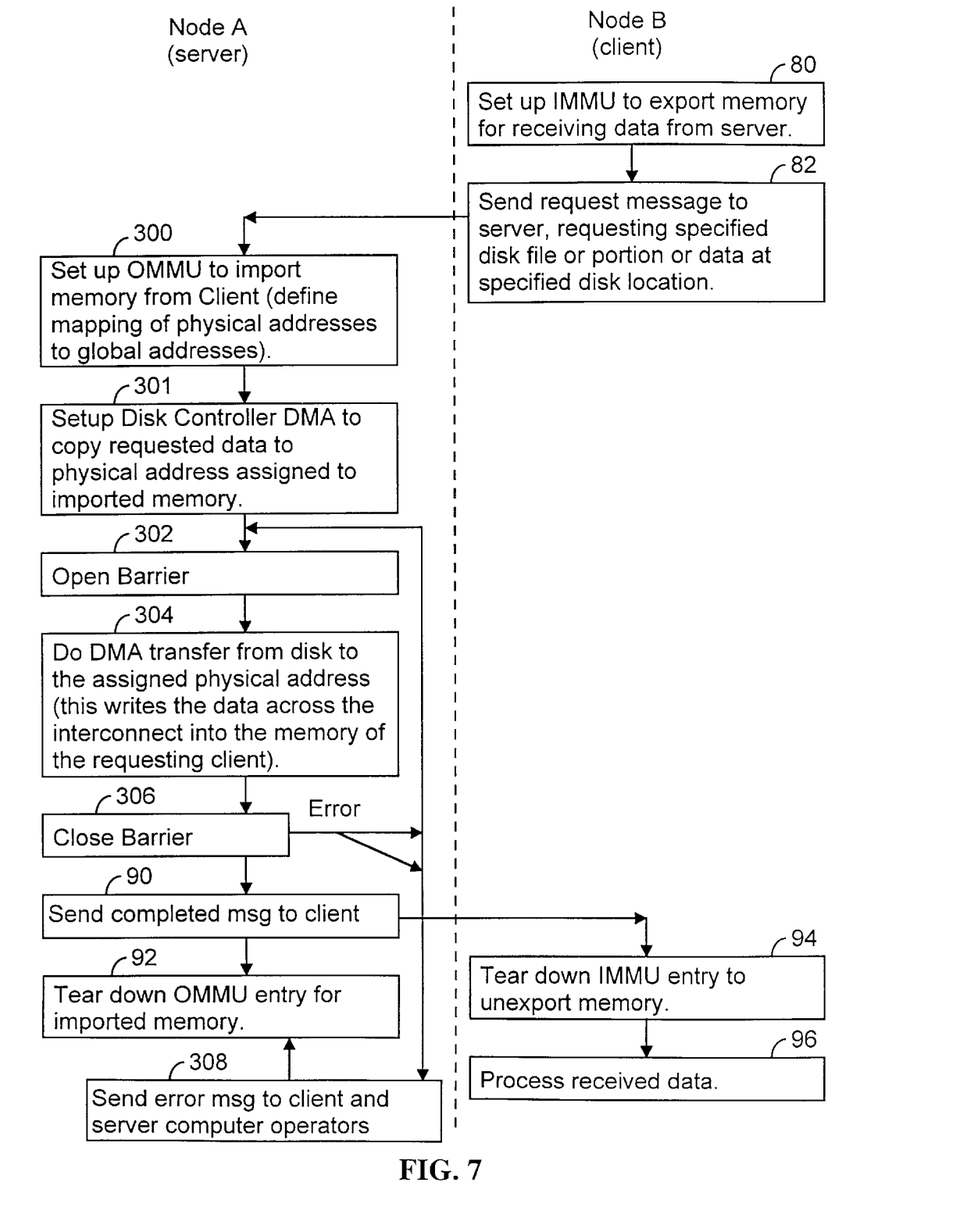
FIG. 7 is a flow chart of a procedure for a process on a first computer node B to read information from a disk at another computer node A in accordance with one embodiment of the present invention.

FIG. 7 shows the improved remote disk data read procedure of the present invention, which enables a process on node B to read information from a disk at node A. Some of the steps of this procedure are the same as those described above with respect to FIG. 5, and therefore assigned the same the reference numbers as in FIG. 5. New or modified steps are assigned new reference numbers.

The first step is for Node B to set up a receive buffer by "exporting memory" to node A (step 80). In some implementations, this step may be performed in advance, because it is known in advance that Node B will be performing many disk reads from Node A. In most implementations, however, the memory exporting step is performed in response to a remote disk read request by a user or kernel process in Node B. The memory exporting step 80 is performed by creating an IMMU entry in Node B that maps the physical address range of a receive buffer in Node B's memory to a corresponding range of global addresses. As indicated above, Node B will typically have a range of global addresses preassigned to it for exporting memory to other nodes. However, other mechanisms for assigning global addresses would be equally applicable.

Next, at step 82, a request message is transmitted by the client node (Node B) to the server node (Node A) at which the requested information is stored. The request message specifies:

the destination node to which the message is being transmitted;

the source node from which the message is being sent;

the information source, such as a disk file, disk file portion or disk location range that contains the requested information;

the global address to which the requested information is to be transmitted; and other parameters, such as protocol parameters, not relevant here.

At the server (Node A), when the request message is received, the server sets up an OMMU entry to import the memory being exported by the requesting client node, Node B, (step 300). The OMMU entry set up at step 300 maps a range the global address range specified in the received message to a corresponding range of physical memory in the server node. However, unlike in step 84 in FIG. 5, the mapped local physical addresses do not denote locations in the second computer's memory, rather the mapped local physical addresses are physical addresses reserved for use by the server's network interface. If necessary (e.g., if a sufficiently large contiguous range of physical addresses assigned to the network interface is not available and/or the size of the mapped address range is not equal to $2^n$ pages), the server node will generate two or more OMMU entries so as to map the specified global address space to two or more local physical address ranges.

Once the IMMU in the requesting node B and the OMMU in the responding or sending node A have been set up, the disk controller in the server sets up its internal DMA 332 (shown in FIG. 8) to copy the requested data to the local physical address (in the server) assigned to the imported memory (step 301). In other words, the DMA's source address, destination address, and data quantity count registers are set up with the values required to perform a direct data transfer from the disk device to local physical addresses assigned to the memory located in the requested client computer.

Next, the server performs an "open barrier" operation (step 302), which essentially stores a network communications error event count (CEEcount) in a local variable (LEEcount). When a "close barrier" operation is performed at a later time, the driver for the network interface waits for any pending send operations to complete, and then the current network communication s error event count CEEcount is compared with the locally stored value LEEcount, and an error condition flag is raised if the two are not equal.

After the "open barrier" step, the disk controller DMA transfer operation is initiated, causing the requested data to be transmitted from the disk directly to the server's network interface (304). Because the destination addresses for the DMA match are mapped by the OMMU, the NIC card receives the disk data directly off the relevant internal bus and retransmits that data onto the communication channel to the requesting server with the local physical destination addresses translated into the corresponding global addresses. At the requesting client computer, the global addresses in the transmitted data are converted into local physical addresses by the receiving client computer's IMMU, and then the data is transmitted on a local internal bus for storage in the receive buffer corresponding to those local physical addresses. As indicated earlier, all the aforementioned address translations and data retransmissions by the network interfaces are totally automatic and represent the standard operation of such devices.

After the server transmits the requested data to the requesting node (steps 301, 302, 304), it then performs a "close barrier" operation (step 306) to determine whether or not the data transmission was successful. Actually, the close barrier may detect a data transmission error or other communications system error unrelated to the data transfer protected by the open-close barrier pair of instructions. If the close barrier operation raises an error flag, steps 302, 304 and 306 are repeated. If after a predetermined number of iterations the data transmission continues to be unsuccessful, an error message is sent to the client and server computer operators (which may simply involve writing an error message into a log file).

After the DMA operation completes, causing the requested data to be completely transmitted to the receive buffer in the requesting node, a "completed" message is transmitted by the sending node to a predefined message queue location in the requesting node (step 90), so as to inform the requesting node that the transmission of the requested data has been completed.

Finally, the server "tears down" the connection by deleting the OMMU entry (or entries) for the imported memory associated with the request from Node B (step 92).

In response to the completed message, the requesting node tears down its side of the connection by deleting the corresponding IMMU entry (or entries) so as to unexport the memory used for the request, and to return local read/write control to that portion of the requesting system's local physical memory (step 94). Then, or in parallel with the tear down operation, the requesting node processes the received data (step 96).

Of course, there are many variations on the sequence of operations described above with reference to FIG. 7 for performing a remote disk read operation. However, the DMA operation steps (300, 304) described above provide a significant advantage over prior art remote disk read methods. In particular, the disk read operation is performed faster because the store to local server memory operation is avoided, reducing system latency. Also, and quite importantly, memory usage in the server is reduced because the server does not need to allocate local memory resources for use by a client computer's remote read operations.

Figure 8:
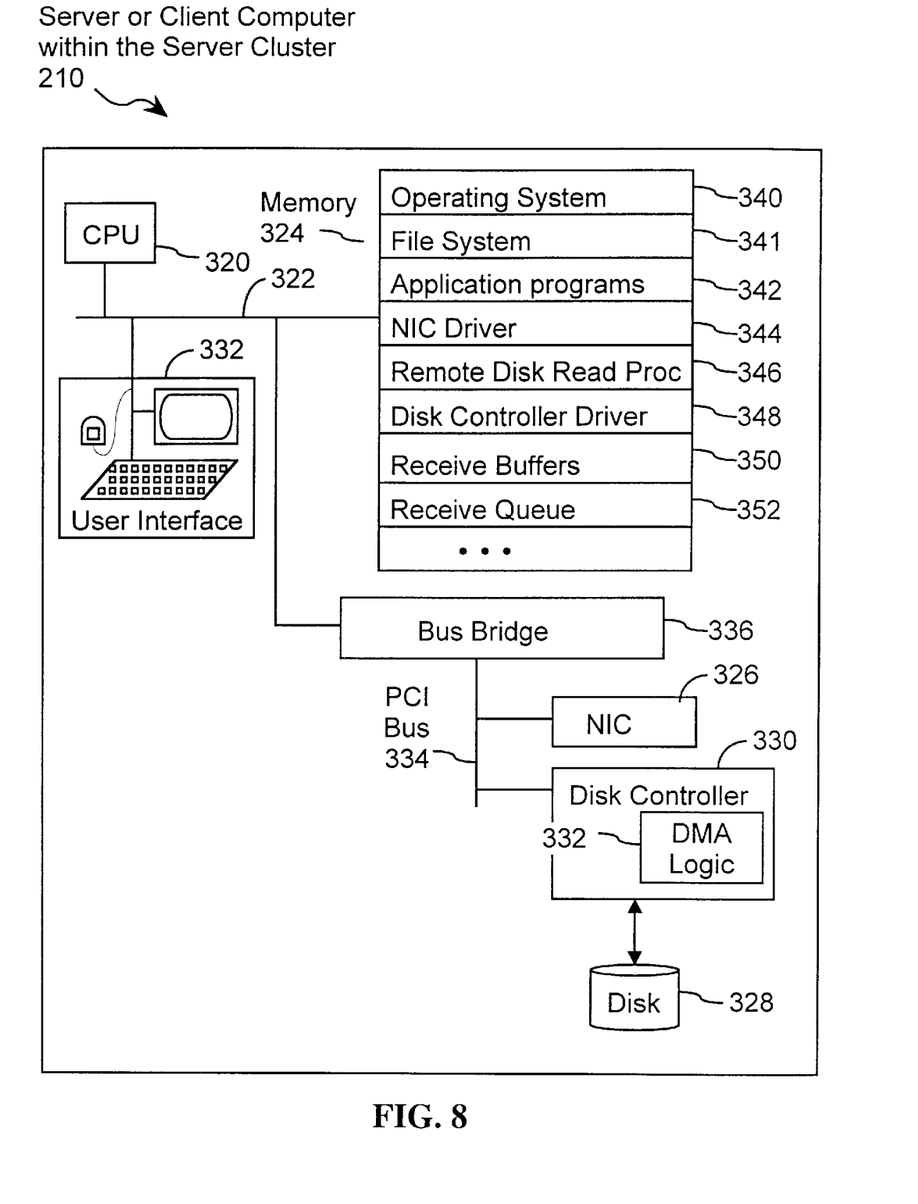
FIG. 8 is a block diagram of a server or client computer incorporating a preferred embodiment of the present invention.

FIG. 8 shows a block diagram of a computer 210 within the server cluster 200 (see FIG. 6). The computer 210 can be either a server or client with respect to a particular remote disk read operation. The computer 210 includes a CPU 320, an internal communication or memory bus 322, random access memory 324, a communications or network interface (NIC) 326, and a non-volatile, non-random access memory device 328, such as a high speed magnetic disk, and a corresponding disk controller 330. The disk controller 330 includes DMA logic 332 for performing direct memory access (DMA) data transfers to and from the disk storage device 328.

In a preferred embodiment, the NIC 326 and disk controller 330 are coupled to a PCI bus 334 that is, in turn, coupled to the main memory bus 322 by a bus bridge 336. The computer's memory 324 stores, usually in conjunction with the disk storage device 328:

an operating system 340 (e.g., Sun Microsystems' Solaris™ operating system);

application programs 342, including application programs that can request data from a remotely located disk storage device;

a file system 341 that, among other things, handles file transfers between computer nodes in response to application program commands; the file system includes client and server file system portions for handling the client and server sides of a file transfer;

a NIC driver 344 for controlling the network interface 326 and for managing use of the IMMU and OMMU therein (not shown in FIG. 8);

a remote disk read procedure 346 (which is preferably implemented as part of the operating system 340) for performing the client side portion of the remote disk read procedure, in conjunction with NIC driver 344;

a disk controller driver 348 for controlling use of the disk controller, including setting up the disk controller's DMA;

receive buffers 350 for receiving data requested from a remote node; and a receive queue 352 for receiving "completed" messages and the like from remote nodes after they have transmitted data to the computer 210.

The client side portion of the file system 341 performs step 82, which kicks off the entire chain of events for performing a remote disk I/O operation.

The server side of the remote disk read procedure, as shown in FIG. 7, is implemented in the file system 341 (for performing step 90), step NIC driver 344 (i.e., for performing steps 300, 302, 306, 308 and 92) and the disk controller driver 348 (i.e., for performing steps 301 and 304). Although it isn't shown in FIG. 7, the entire chain of steps performed on the server side are performed under the control of the server side portion of the file system 341 (i.e., step 82 on the client side talks to the server side of the file system 341, which then initiates the set of steps shown on the server side of FIG. 7).

Remote Disk Write

The exact same techniques as those described above can also be used to perform a remote disk write operation. That is, a client node can write data directly to the disk on a server node using the same procedure as shown in FIG. 7, with the following minor changes. At step 80, memory containing the data to be written to disk is exported. At step 82, the request message indicates the disk write operation to be performed. At step 301 the disk controller DMA is set up to read data remotely to disk and at step 304 the DMA remote read to disk is performed (i.e., data from the client is written onto the disk).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of performing a remote disk read operation between first and second computers, comprising the steps of:

at the second computer, responding to receipt of a request message from the first computer, the request message specifying data to be retrieved from a disk located at the second computer and a range of global addresses associated with an allocated receive buffer; the responding step including:

mapping the range of global addresses specified in the request message to a corresponding range of local physical addresses, wherein the mapped local physical addresses do not denote locations in a memory in the second computer's memory;

performing a DMA operation for directly transferring the data specified in the request message from the disk to the mapped local physical addresses, the DMA operation transmitting the specified data to a network interface in the second computer at which the mapped local physical addresses to which the data is being transferred are converted into the corresponding global addresses; and transmitting the specified data with the corresponding global addresses to the first computer.

2. The method of claim 1, wherein the mapping step includes storing an entry in an output memory mapping unit in the second computer for mapping the range of global addresses specified in the request message to a corresponding range of local physical addresses.

3. The method of claim 2, wherein at the second computer the entry in an output memory mapping unit is deactivated after the specified data is successfully transmitted to the first computer.

4. In a distributed computer system, apparatus for performing a remote disk read operation between first and second computers, comprising:

at the second computer:
a CPU;
memory;
a disk that stores the data specified in the request message;
an output memory management unit (OMMU);
a network interface coupled to the communication channel;
a network interface driver, executable by the CPU, that: stores in OMMU an entry that maps the range of global addresses specified in the request message to a corresponding range of local physical addresses, wherein the mapped local physical addresses do not denote locations in a memory in the second computer's memory; and
a disk controller, coupled to the disk, wherein the disk controller is coupled to the network interface by an internal bus; the disk controller including DMA logic for directly transferring the data specified in the request message from the disk to the mapped local physical addresses, the DMA operation transmitting the specified data to the network interface in the second computer at which (A) the mapped local physical addresses to which the data is transferred are converted into the corresponding global addresses in accordance with the entry stored in the OMMU, and (B) the specified data is transmitted with the corresponding global addresses to the first computer via the communication channel.

5. The apparatus of claim 4, wherein the network interface driver in the second computer deactivates the OMMU entry after the specified data is successfully transmitted to the first computer.

6. A method of performing a remote disk read operation between first and second computers, comprising the steps of:

at the second computer, responding to receipt of a request message from the first computer by:

directly transferring data specified in the request message from a disk in the second computer to a network interface in the second computer using a memory mapped DMA transfer, the memory mapped DMA transfer having a range of destination addresses set to a range of local physical addresses that do not denote locations in the second computer's memory; and in the network interface of the second computer, converting the range of destination addresses into corresponding global addresses, and transmitting to the first computer the transferred data using the corresponding global addresses.

* * * * *